(12) United States Patent
Erel et al.

(10) Patent No.: US 9,420,098 B2
(45) Date of Patent: Aug. 16, 2016

(54) PREDICTION INTERACTIVE VOCLA RESPONSE

(71) Applicant: NICE-SYSTEMS LTD, Ra'anana (IL)

(72) Inventors: Omer Erel, Tel Aviv (IL); Shay Levy, Ra'anana (IL); Dmitri Volsky, Kfar-Saba (IL)

(73) Assignee: NICE-SYSTEMS LTD, Ra'Anana (IL)

( * ) Notice: Subject to any disclaimer, the term of this patent is extended or adjusted under 35 U.S.C. 154(b) by 229 days.

(21) Appl. No.: 13/936,227

(22) Filed: Jul. 8, 2013

(65) Prior Publication Data

US 2015/0010134 A1 Jan. 8, 2015

(51) Int. Cl.
*H04M 1/64* (2006.01)
*H04M 3/493* (2006.01)
*H04M 3/42* (2006.01)

(52) U.S. Cl.
CPC ........ *H04M 3/4936* (2013.01); *H04M 3/42068* (2013.01); *H04M 2203/551* (2013.01)

(58) Field of Classification Search
CPC ............ H04M 3/493; H04M 2201/40; H04M 3/4936; H04M 3/51; H04M 3/5166; H04M 3/5175; H04M 3/42221; H04M 3/523; H04M 3/42068; H04M 2201/38; H04M 3/42059; H04M 3/436; H04M 3/5183; H04M 2203/301; H04M 2250/74; H04M 3/385; H04M 2203/355; H04M 3/5233; H04M 2250/66; H04M 15/00; H04M 15/08; H04M 3/42; H04M 2203/551; H04M 2203/556; H04M 2203/408; H04M 2203/2038; H04M 2203/555; H04M 3/5235; G10L 15/22; G10L 2015/227

USPC ................ 379/88.01, 265.02, 201.01, 88.02, 379/88.04, 265.12, 88.16, 88.21, 265.1, 379/265.09, 201.03, 211.01, 265.13, 379/201.02, 8, 8.21

See application file for complete search history.

(56) References Cited

U.S. PATENT DOCUMENTS

| | | | |
|---|---|---|---|
| 6,347,139 B1 * | 2/2002 | Fisher et al. ............. | 379/265.12 |
| 8,139,727 B2 * | 3/2012 | Awad et al. ................ | 379/88.16 |
| 8,155,280 B1 * | 4/2012 | Or-Bach et al. ............ | 379/88.13 |
| 8,488,774 B2 * | 7/2013 | Mahalaha ........... | H04M 3/5233 379/265.01 |
| 2007/0073723 A1 * | 3/2007 | Ramer ................... | G06Q 30/02 |
| 2010/0191658 A1 * | 7/2010 | Kannan ................ | G06F 17/279 705/304 |
| 2013/0156170 A1 * | 6/2013 | Springer ............... | H04M 3/493 379/88.22 |
| 2013/0266127 A1 * | 10/2013 | Schachter ............... | G10L 25/48 379/88.01 |
| 2014/0088952 A1 * | 3/2014 | Fife ......................... | G06F 17/27 704/9 |
| 2014/0270133 A1 * | 9/2014 | Conway ............. | H04M 3/5233 379/265.1 |
| 2014/0355748 A1 * | 12/2014 | Conway ............. | H04M 3/5233 379/265.1 |

\* cited by examiner

*Primary Examiner* — Akelaw Teshale
(74) *Attorney, Agent, or Firm* — Soroker Agmon Nordman

(57) ABSTRACT

A method for responding to calls in an Interactive Voice Response system (IVR) of an organization, the method comprising receiving in an IVR a call from a customer of the organization, activating a response in the IVR based at least on former interactions with the organization, and wherein the IVR is a computerized system comprising at least one processor, and an apparatus for performing the same.

13 Claims, 9 Drawing Sheets

PREDICTION INTERACTIVE VOCLA RESPONSE

BACKGROUND

The present disclosure generally relates to Interactive voice response, and more specifically to estimating an intended voice response.

Interactive voice response (IVR) is known in the art.

Generally, in IVR a caller is presented with numerous voiced menus, enabling the caller to select a seemingly suitable menu.

SUMMARY

One exemplary embodiment of the disclosed subject matter is a method for responding to calls in an Interactive Voice Response system (IVR) of an organization, the method comprising receiving in an IVR a call from a customer of the organization, activating a response in the IVR based at least on former interactions with the organization, and wherein the IVR is a computerized system comprising at least one processor.

Another exemplary embodiment of the disclosed subject matter is an apparatus for responding to calls in an Interactive Voice Response system (IVR) of an organization, the apparatus comprising an IVR configured to activates vocal responses to a call from a customer, a computerized model that receives past interactions of customers with the organization and configured to determine an intent of the customer based on the past interactions with the organization, and a computerized correlation engine configured to associate intents of the customer with a response of the IVR.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1A:
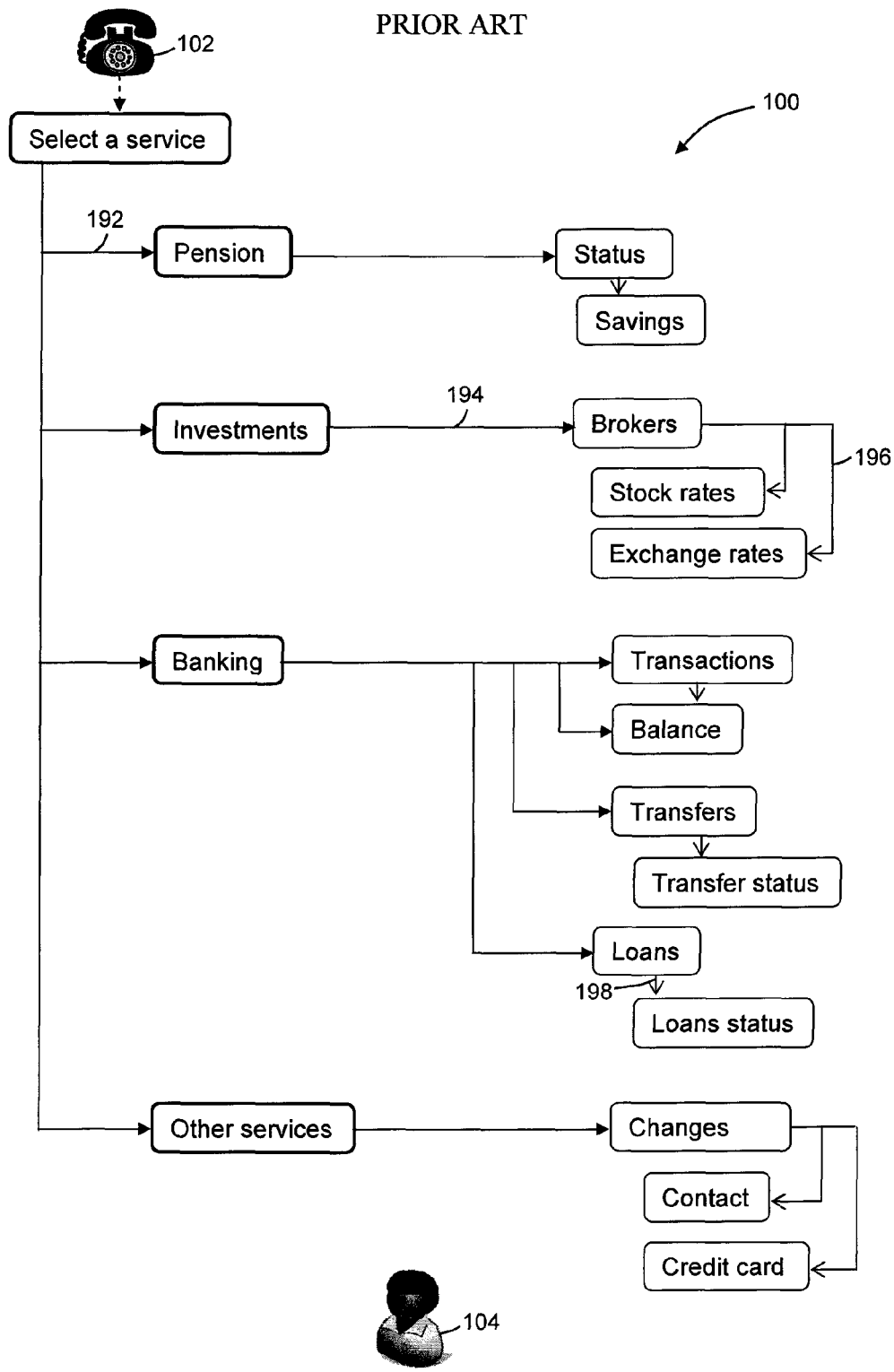

References to previously presented elements are implied without necessarily further citing the drawing or description in which they appear.

Figure 1B:
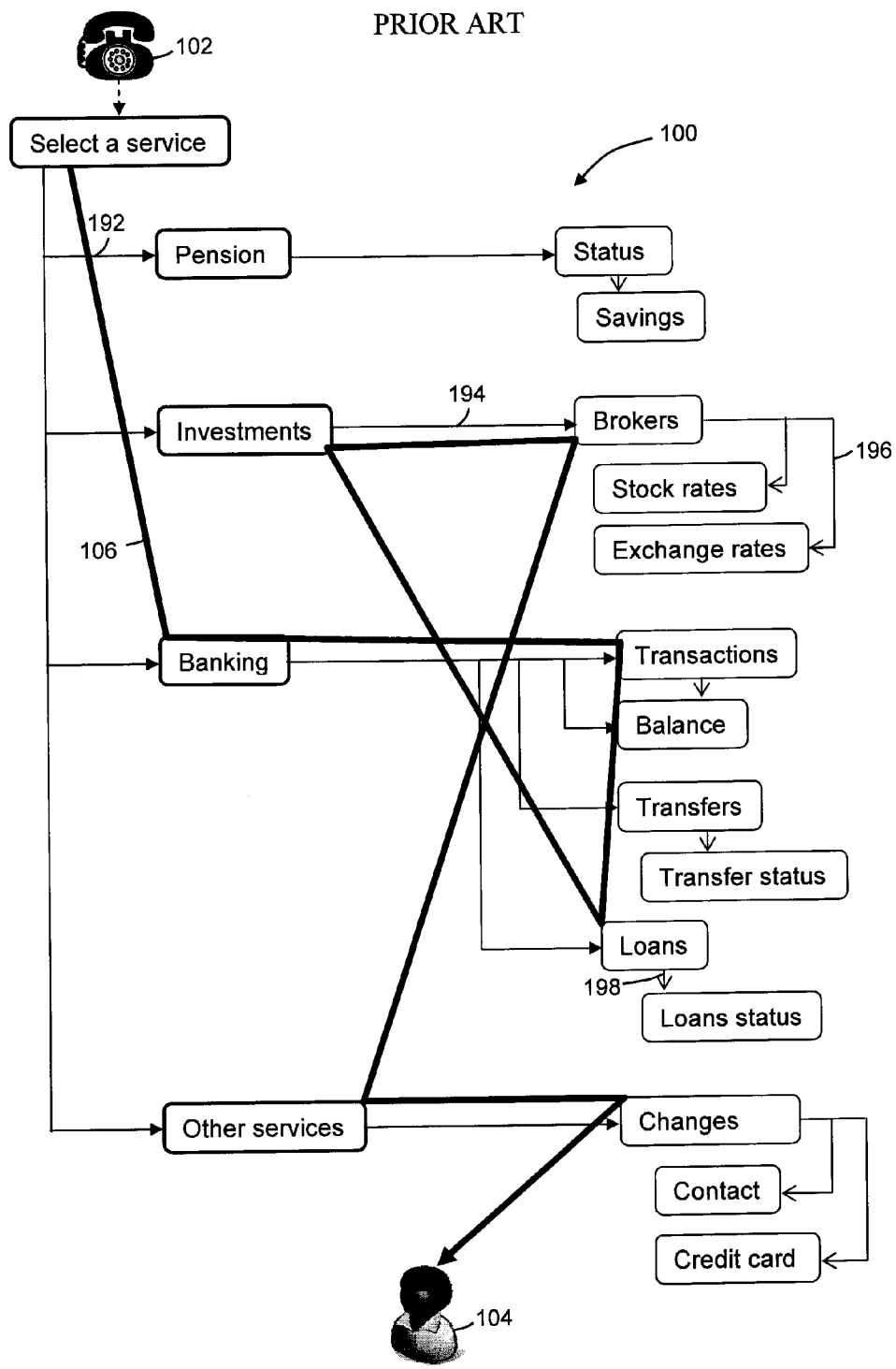
Figure 1C:
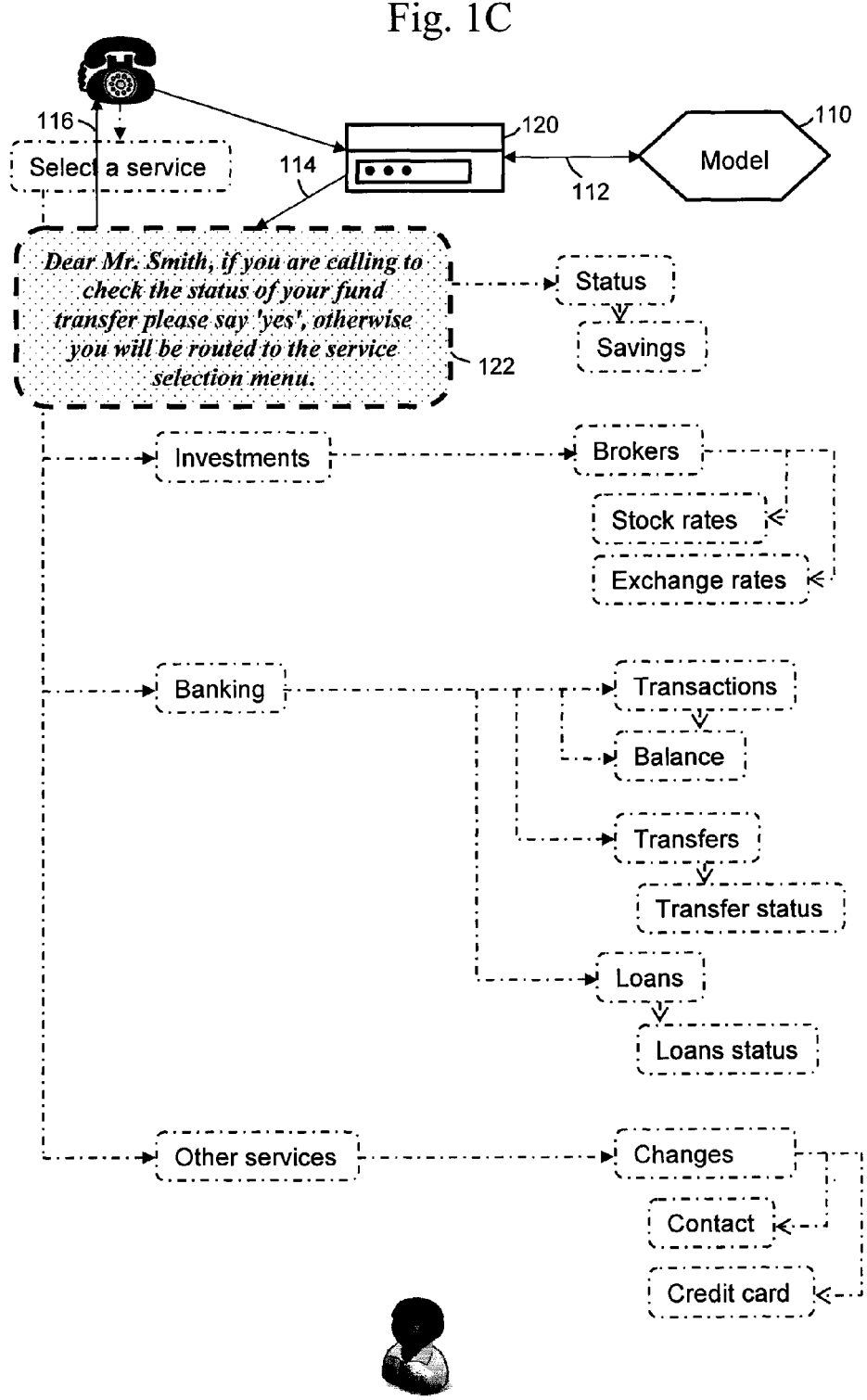
Figure 1D:
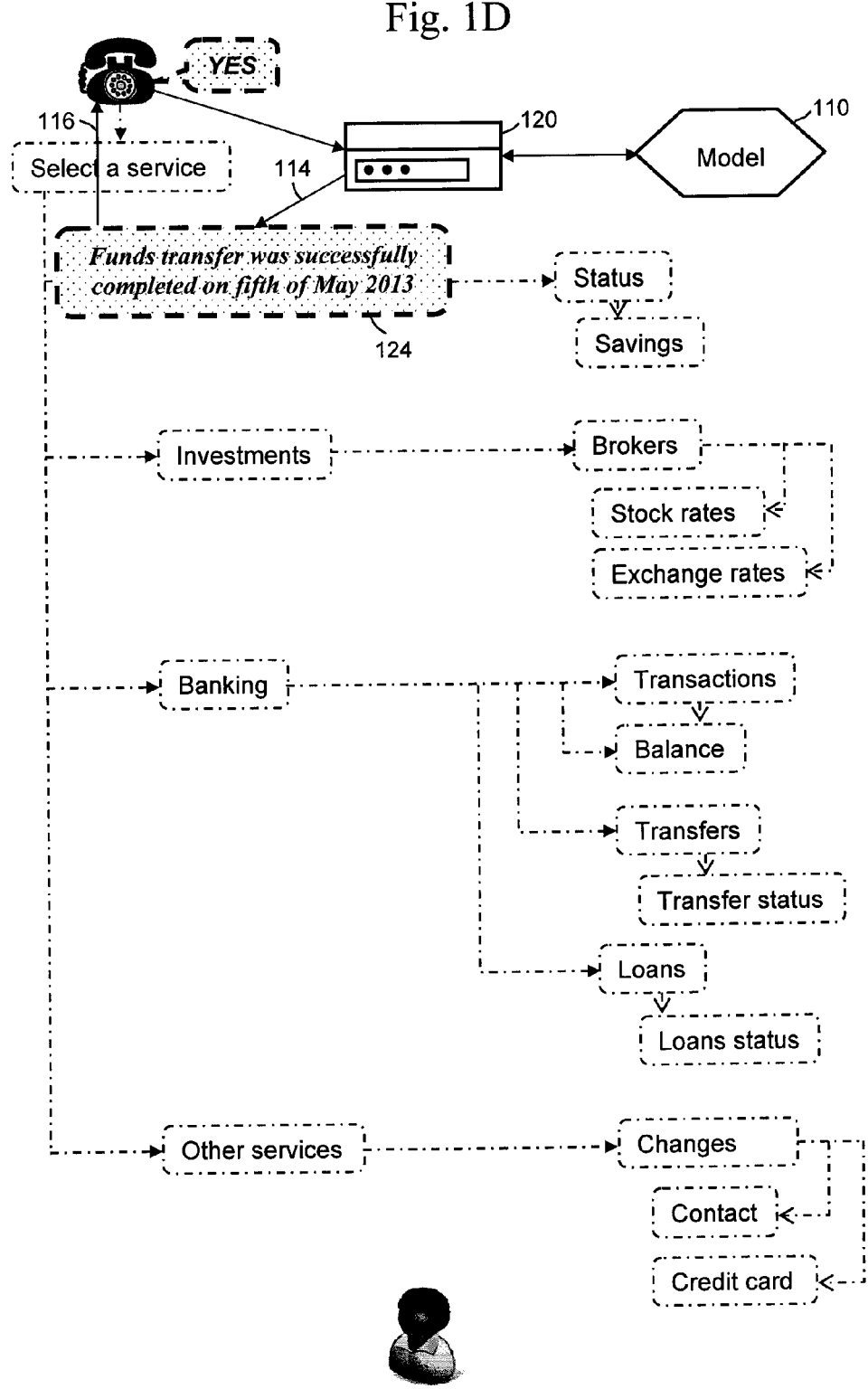
Figure 2A:
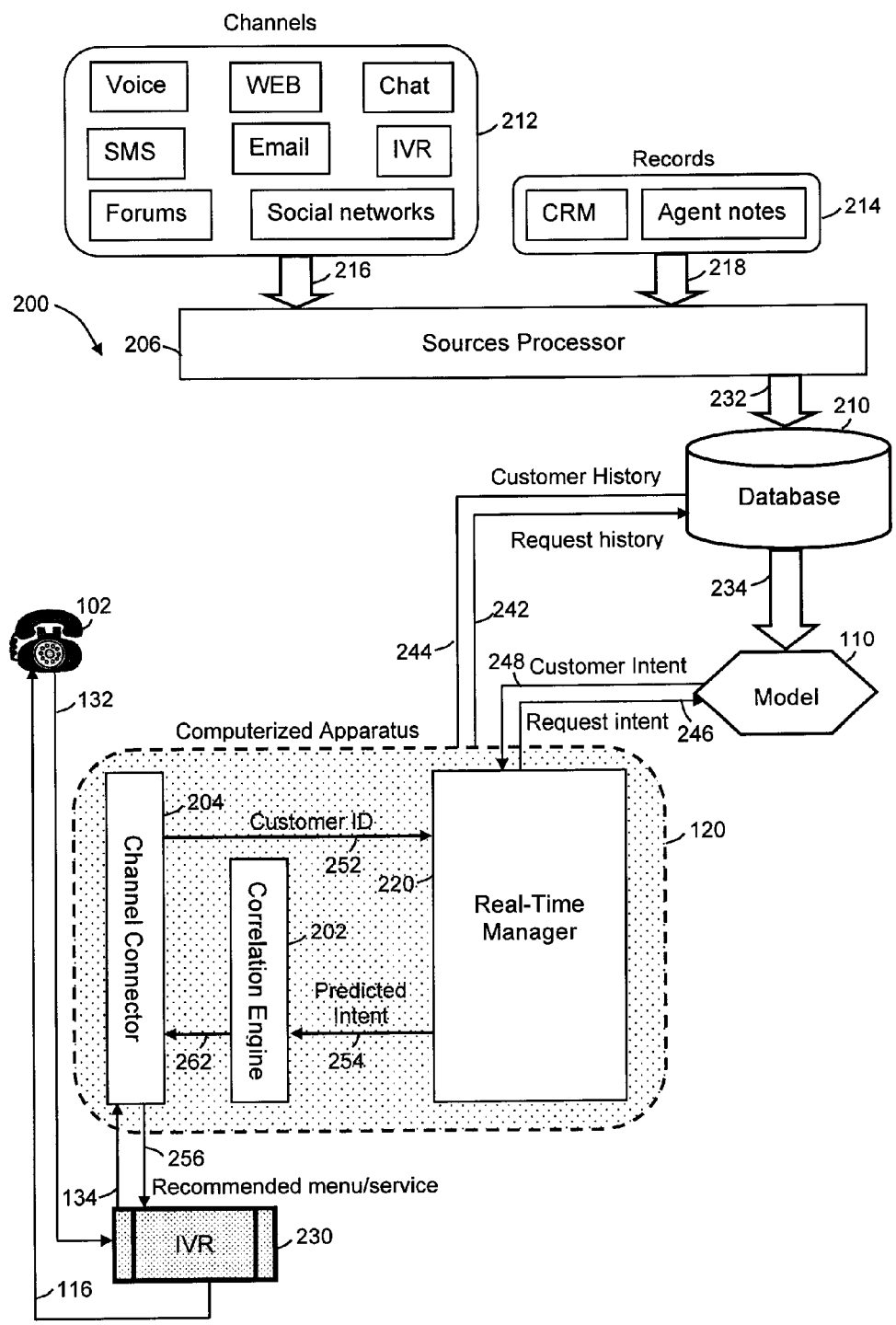
Figure 2B:
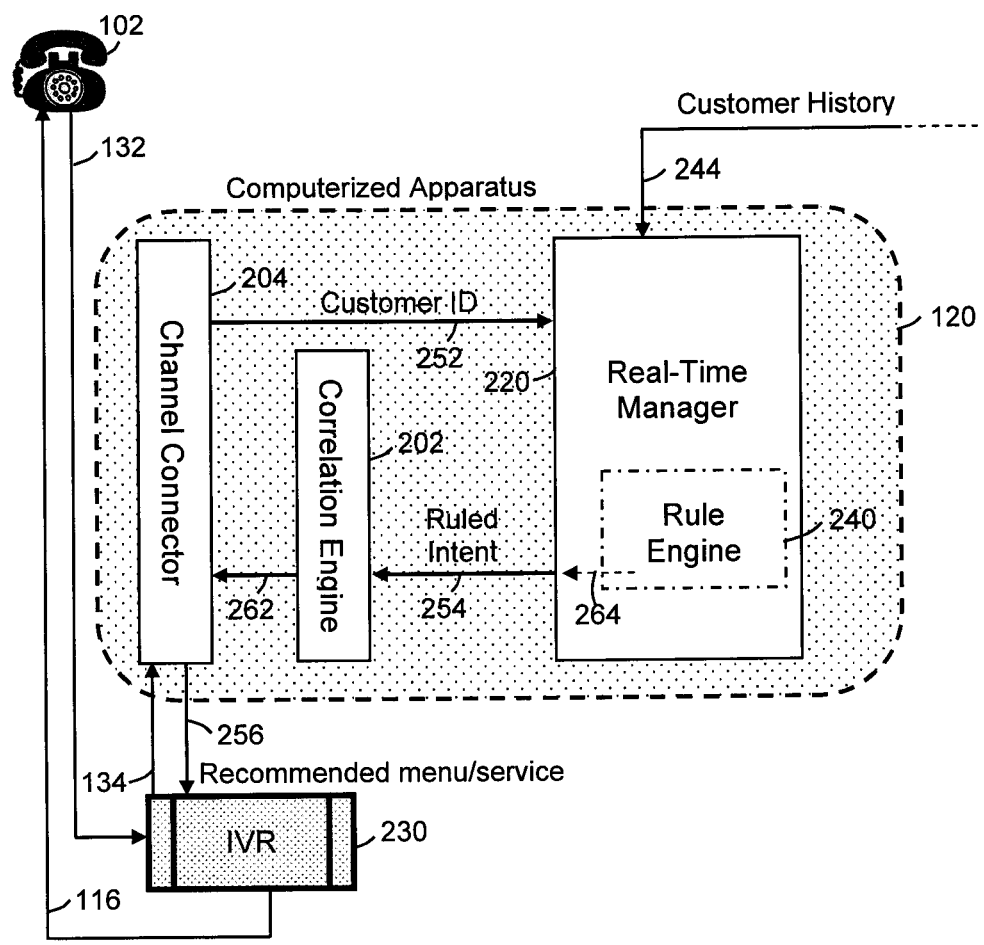
Figure 3:
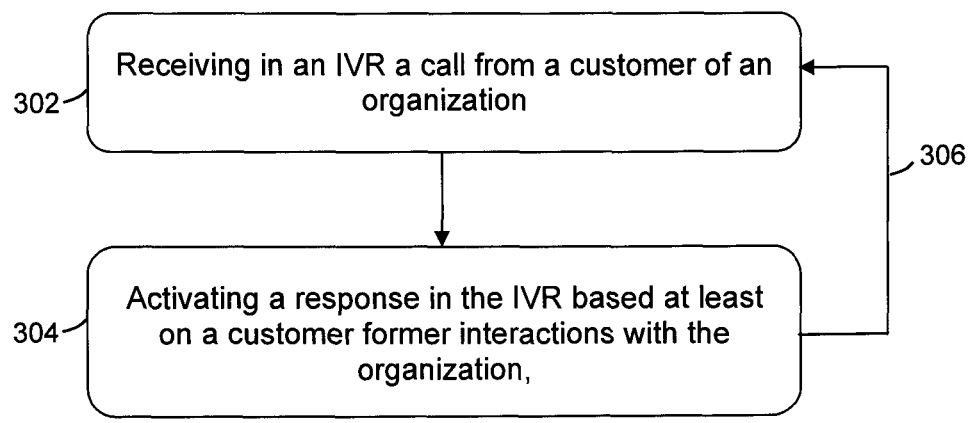
Figure 4:
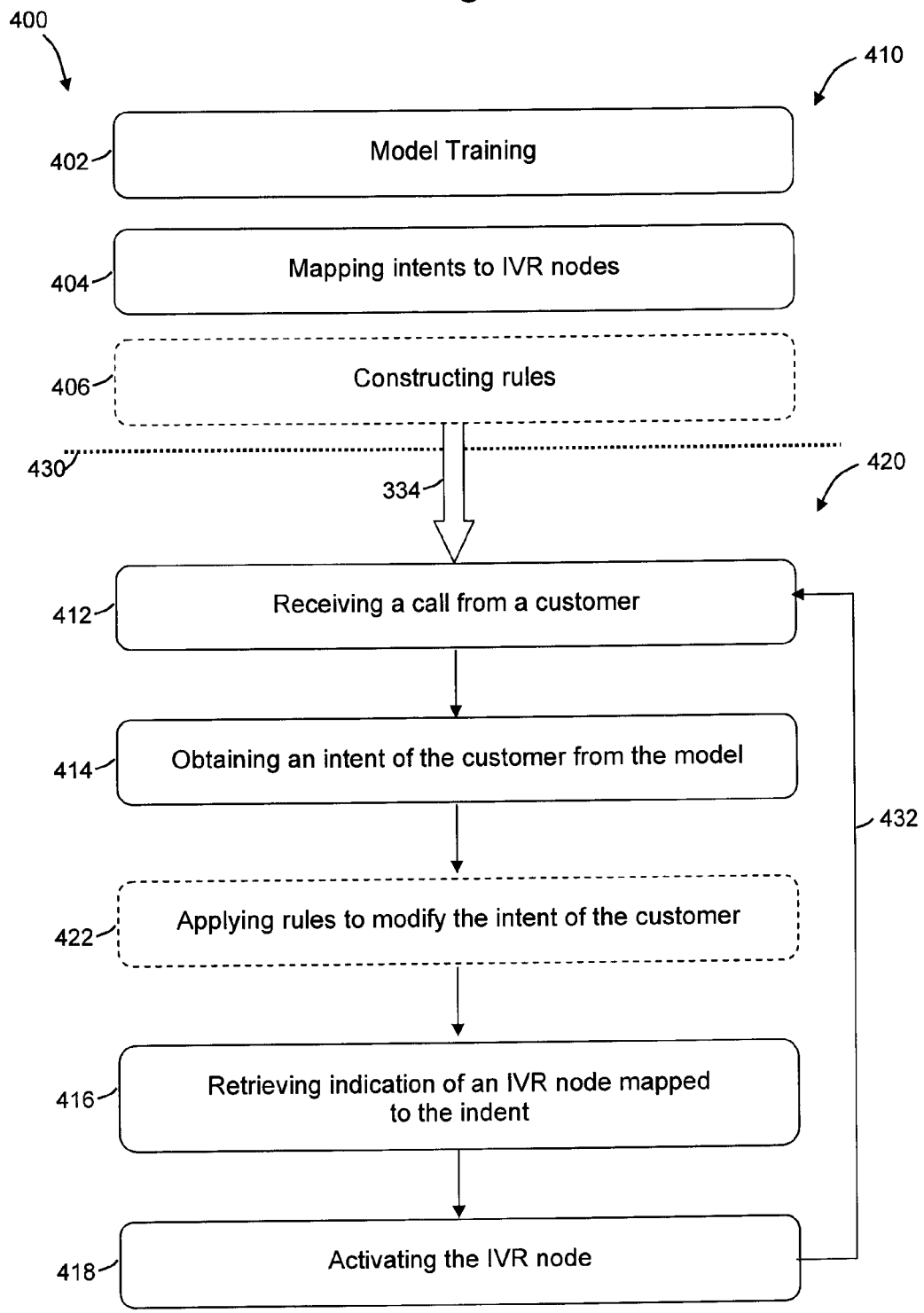
Figure 5:
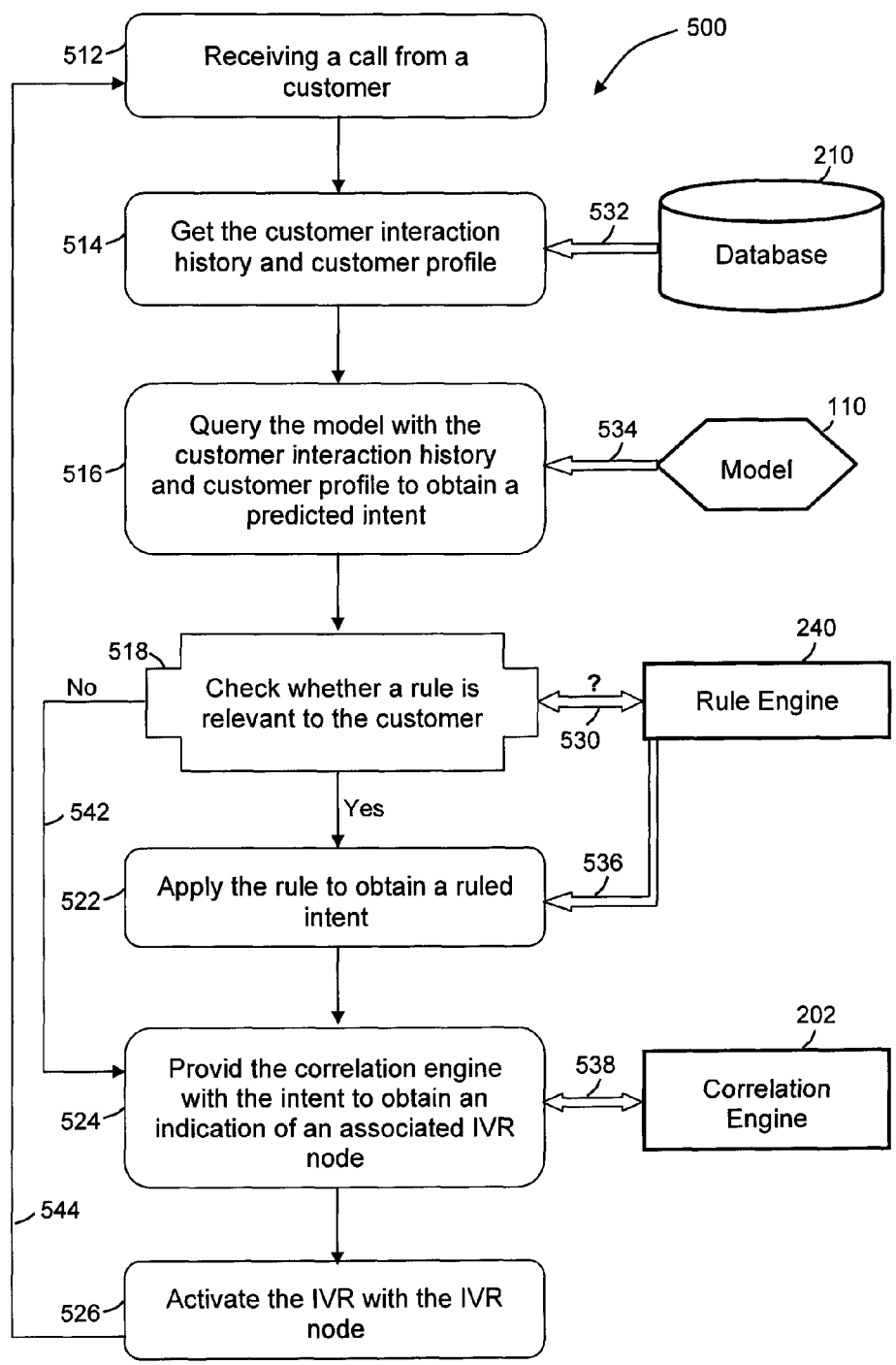

FIG. 1A schematically illustrates representative vocal menus of an IVR of a call center of an organization;

FIG. 1B schematically illustrates a representative navigation path in vocal menus of an IVR of a call center of an organization;

FIG. 1C schematically illustrates a direct messaging in an IVR of a call center of an organization, according to exemplary embodiments of the disclosed subject matter;

FIG. 1D schematically illustrates a direct messaging in an IVR of a call center of an organization based on a response from the caller, according to exemplary embodiments of the disclosed subject matter;

FIG. 2A schematically illustrates an architecture of a computerized hardware for a direct messaging in an IVR of a call center of an organization, according to exemplary embodiments of the disclosed subject matter;

FIG. 2B schematically illustrates an extension of the architecture of a computerized hardware of FIG. 2A, according to exemplary embodiments of the disclosed subject matter;

FIG. 3 briefly outlines a response to a call, according to exemplary embodiments of the disclosed subject matter;

FIG. 4 outlines an operational flow, according to exemplary embodiments of the disclosed subject matter; and FIG. 5 illustrates some further aspects to the operational flow of FIG. 3, according to exemplary embodiments of the disclosed subject matter.

DETAILED DESCRIPTION

In the context of some embodiments of the present disclosure, without limiting, an IVR is a computerized system comprising at least one processor for interactive voice response to phone calls as known in the art and/or variation thereof. generally, without limiting the IVR is connected to a telephony system such as Computer telephony integration (CTI).

Generally, without limiting the IVR belongs and/or operated on behalf on an organization such as a business. Thus, when a person calls up the organization the IVR is operated to respond to the call. The person who calls the organization is denoted also as a caller, and persons that call and/or called the organization and/or otherwise contacted with the organization such as by SMS or Email or social network are denoted, without limiting as customers of the organization or customers.

According to the context, without limiting, the communications as an interaction of a caller with the organization as via the IVR, and/or behavior of the customer as in the IVR, are referred to as an interaction with the organization or as interactions.

In the context of some embodiments of the present disclosure, without limiting, the IVR responds to a call with vocal offers and/or services, collectively denoted also as nodes or menu items or for brevity as menus. Optionally, the nodes are arranged in a hierarchical manner such that a menu may be a sub-menu item or sub-menu down in the hierarchy. A node may or menu is presented as a vocal message such as for information and/or a prompt for other actions and/or routing to a service personnel and/or other services, collectively referred to also as a response of the IVR.

In the context of some embodiments of the present disclosure, without limiting, in regarding operation of apparatus or apparatuses two phases are distinguished, where one is a preparatory or setup phase denoted also as training phase, and the other is operational phase denoted also as real-time or run-time or production phase, referred to also as run-time phase.

In the context of some embodiments of the present disclosure, without limiting, referring to consulting a model and/or another construct implies querying and/or obtaining information from the model and/or the other construct.

The terms cited above denote also inflections and conjugates thereof.

One technical problem dealt by the disclosed subject matter is directly offering an anticipated service for a caller in an IVR of an organization, thereby reducing and/or eliminating navigation though numerous voice menus of the IVR.

One technical solution according to the disclosed subject matter is initially analyzing a sufficiently large corpus of IVR interactions of callers to the organization and/or other communications with the organization via other channels or media such as Web sites, Emails, SMS and so forth. Based on behaviors of the callers in the IVR and in other media, constructing a model configured to anticipate and/or predict the services the callers in the IVR are likely to require.

Consequently, in a run-time phase, when a caller calls up the organization, a computerized apparatus of the organization determines by the model a likely service of the organization for the caller, and controls the IVR to directly offer that service to the caller. In some embodiments, the service is determined according a priority such as for cost effective determination. For example, in case a service as a message and a service as routing to a personnel are determined, the service as a message is selected to avoid the costly interaction with a personnel.

Generally, a behavior of a caller in the IVR is the menu of the IVR and/or service of the organization the caller has searched for or navigated to. Optionally, the behavior is determined with respect to some characteristics of the caller, such as date or time of the call, telephone number used for the call and/or any other characteristic such as time lapse from sending a bill to the caller by the organization.

In some embodiments, the model is constructed such that for each caller, or possibly a group of callers of similar behaviors, intents of callers are deduced and the intents are mapped to menus and/or services of the IVR, possibly in a manner of one menu to many intents.

Consequently, in run-time phase, by consulting the model, the computerized apparatus of the organization determines the intent or intents of a caller and maps intent or intents to a destination menu and/or service of the IVR and directs the caller to that menu and/or to corresponding menu and/or service.

In some embodiments, the computerized apparatus of the organization updates the model according to the behaviors of callers in the in a run-time phase. For example, acceptance of the service offered by a caller and/or navigation of the caller to another menu or service.

A potential technical effect of the disclosed subject matter is an IVR controlled by a computerized apparatus that operates to save excessive or unnecessary navigation in menus of an IVR and avoiding superfluous contacts with personnel.

A general non-limiting presentation of practicing the present disclosure is given below, outlining exemplary practice of embodiments of the present disclosure and providing a constructive basis for variant and/or alternative and/or divergent embodiments.

FIG. 1A schematically illustrates, as non-limiting representation, vocal nodes 100 of an IVR of a call center of an organization, such as known in the art. Vocal nodes 100 comprise voice menus and voice sub-menus of different of different orders.

For clarity and brevity, in the context of the present disclosure referring to a node or a menu or sub-menu implies a voice menu and a voice sub-menu. Likewise, with respect to vocal nodes 100, referring to an entry of a menu or menus implies a voice menu or voice sub-menu according to the context.

The hierarchy of the nodes is depicted by arrows, where high orders of hierarchy are depicted by bold arrows such as an arrow 192 or an arrow 194, and low orders of hierarchy are depicted by ordinary arrows such as an arrow 196 or an arrow 198.

A caller to the IVR of the organization is illustrated schematically as a telephone 102, and a service person of the organization is illustrated schematically as an individual 104.

FIG. 1B schematically illustrates a non-limiting representative navigation path in nodes of an IVR of an organization.

By way of example, the caller is interested in to verify that a fund that he or she transferred to an account was indeed carried out. Thus, the caller activates the Banking menu, and navigates between the banking sub-menus. Not realizing that the Transfers menu also has further a Transfers Status sub-menu and not finding another appropriate entry, the caller tries the Investments menu, and failing to find an appropriate entry the caller tries a menu for Other Services. Further failing to find an appropriate entry the caller tries to reach service person of the organization which typically and/or generally requires a substantial idle waiting time.

Thus, navigating within the structure of an IVR may be tedious and frustrating.

On the other hand, according to exemplary embodiments of the disclosed subject matter, a caller may be presented promptly with an anticipated or predicted service the caller is likely to require based on past behavior thereof, as described and/or exemplified below.

Assuming, by way of example, that the caller is John Smith who regularly transfers on the first date of each month an amount to a certain account via the call center of the organization. Subsequently, after some days, John Smith calls up the call center to verify that the transfer has been executed.

Based on the past regularity of the behavior of John Smith, a computerized apparatus of the organization uses or consults a model configured to deduce and/or determine a likely or anticipated intent or an intent of John Smith based on past calls and/or data of John Smith and/or other callers having similar characteristics of John Smith. Having acquired the intent, computerized apparatus maps the intent to an appropriate menu and/or service of the organization.

Consequently, when John Smith calls up the organization again, the computerized apparatus consults the model and directly presents a vocal message such as "Dear Mr. Smith, if you are calling to check the status of your fund transfer please say 'yes', otherwise you will be routed to the service selection menu", or anything to that effect.

Having said 'yes' the IVR of the call center presents a message such as "Funds transfer was successfully completed on fifth of May 2013", or anything to that effect.

FIG. 1C schematically illustrates a direct messaging in an IVR of a call center of an organization, according to exemplary embodiments of the disclosed subject matter.

By way of example, as John Smith calls up the organization, the computerized apparatus, denoted as an apparatus 120, identifies the caller and communicates with the model, denoted as a model 110, as schematically illustrated by a double-arrow 112.

In the communication with the model the computerized apparatus provides the model with the identification of the caller and obtains from the model the intent of John Smith. Based on the intent, the model provides the computerized apparatus the service for John Smith such as by codes or as a complete or partial message.

Subsequently, as schematically illustrated by an arrow 114, the computerized apparatus produces a vocal message as illustrated by a message denoted as a message 122, and the message is presented vocally to the caller as schematically illustrated by an arrow 116.

FIG. 1D schematically illustrates a direct messaging in an IVR of a call center of an organization based on an affirmative response from the caller, according to exemplary embodiments of the disclosed subject matter.

If John Smith says 'Yes' within a sufficient time, the computerized apparatus deciphers the response, and accordingly produces a vocal message as illustrated by a message denoted as a message 124.

In some embodiments, when servicing the caller, vocal nodes 100 are inactive as illustrated by dot-dash lines of the menus in FIGS. 1C-1D.

Subsequently, in some embodiments, after some time of an action of the caller, such as an utterance or pressing a key on the telephone, vocal nodes 100 are re-activated and the menu for selecting a service is voiced.

In some embodiments, according to the behavior of John Smith in the call thereof, the model of the behavior of John Smith is updated. For example, in case John Smith confirmed that he wished to verify the transfer, the model increases the likelihood that John Smith calls for fund transfer verification some days after the transfer.

The caller is and/or may be identified by any suitable method or technique. For example, caller identification (CID, CLID) in case of a line telephone, an IP in case of a VoIP phone, a log-in procedure where the caller furnishes credentials thereof such as name and password, or any other method such as a voice recognition.

It is noted that in case the caller recurrently used to select or opted for a plurality of menus and/or services, a message suggesting the plurality of menus and/or services may be vocally presented, thereby letting the caller to promptly get one of the plurality of menus and/or services. For example, assuming that two services are suggested, the message vocally prompts the caller to respond by uttering "ONE" or "TWO" for the respective menu and/or service.

It is noted that the messages are exemplary and may be varied. Likewise, the response of the caller is exemplary and may be varied, for example, instead of uttering a response the caller may press a button on the telephone he or she uses.

It is also noted that in response to call the caller is routed to a predicted node of the IVR and/or to a service person, optionally a service person who generally handles the caller.

In some embodiments, past behaviors or interactions of callers are stored such as in a database, and the model is constructed based on the past behaviors or interactions responsive to a call from a caller. Likewise, in some embodiments, the stored behaviors are updated according to a recent call from the caller.

FIG. 2A schematically illustrates an architecture of a computerized hardware 200 for a direct messaging in an IVR of a call center of an organization, according to exemplary embodiments of the disclosed subject matter.

As further described below, computerized hardware 200 comprises a sources processor, a database, an inference model or a prediction model or, in brief, a model, an IVR, and a computerized apparatus that comprises a plurality of computerized components, namely, a channel connector, a correlation engine and a real-time manger.

Several sources of data provided by customers and/or persons in contact with an organization are used to accumulate data about the customers and/or the persons, also collectively referred to as customers.

In some embodiments, the data is provided from one or more communication channels such as but not limited to telephone calls direct or via an IVR, SMS (Short Message Service), Emails, Web sites, online forums, social networks or any other source, collectively referred to as channels and denoted as channels 212.

In some embodiments, the data is provided from one or more records such as but not limited to CRM (Customer relationship management) or notes of an agent regarding customers or any other records, collectively referred to as records and denoted as records 214.

The channels and/or records, such as channels 212 and/or records 214 are also collectively referred to as sources.

As illustrated by an arrow 216 and an arrow 218, the sources are provided to a computerized data processing unit or units, referred to also as a sources processor, and denoted as a sources processor 206.

Sources processor 206 collects data from the sources and optionally, in some embodiments, arranges the data in one or more common and/or established formats as data of the customers.

As illustrated by an arrow 232, sources processor 206 provides the data of the customers to a database in at least one storage device, the database denoted also as database 210, which stores the data of the customers in a suitable format or formats for possibly subsequent retrieval.

In some embodiments, the data of the customers comprise past or historical behaviors of customers in IVR of the organization, optionally together with past data of other channel or channels and/or record or records, which separately and/or jointly may be used to indicate or reveal patterns of behavior of the customers and/or objectives and/or likely objectives of the customers in the organization. The data of the customer as described above is also referred to as the customer interaction history.

In some embodiments, the data of the customers further comprise characterization and/or profile and/or properties of the customers such as age, gender, location or interests, and/or other data obtained from other sources such as CRM, collectively referred to also as customer information or as a profile of a customer or as profile.

The customer interaction history and customer profile and/or part thereof is also collectively referred to as a history of the customer.

The model, denoted as model 110, is configured for inferring and/or determining and/or predicting intentions or objectives of customers in the organization is constructed and maintained such as by a processor (not shown) so that model 110 is a computerized construct or computerized model. The intentions or objectives of the customers are deduced by model 110 based on histories which are provided from database 210 and/or by patterns of past behaviors of the customers.

The data is provided from database 210 to model 110, as schematically illustrated by an arrow 234, which generally occur in a training phase of model 110 as described below and later on.

In some embodiments, the intention or objective of a customer is formed as a construct comprising data that uniquely identify and/or indicate the intention or objective of the customer, the construct denoted as an intent. In some embodiments, the data of the intent comprises an identification of the intent, denoted for example as an IdentID, and/or name of the intent, denoted for example as IdentName.

In some embodiments, based on histories and/or patterns of past behaviors of the customers, model 110 constructs intents of customers. Optionally or alternatively, the intents are formed by another component of computerized hardware 200 (not shown).

It is noted that model 110 determines an intent of a customer based on the history of the customer and/or histories of other customers. For example, in case the interactions of one or more customers exhibited some behavioral pattern or patterns, then an intent of another customer is obtained based on the behavioral pattern of the one or more customers, where the another customer has some common or resembling characteristics with the one or more customers such as by profiles thereof.

In some embodiments, having constructed the intents, such as by model 110, the intents are provided to the correlation engine, denoted as correlation engine 202.

Correlation engine 202 is configured to acquire the menus, such as vocal nodes 100, from the IVR of the organization, denoted as IVR 230. Correlation engine 202 is further configured to map the provided intents to corresponding nodes as menus and/or services of IVR 230, such that each intent is mapped to one node where several intents may be mapped to same node. Thus, correlation engine 202 correlates between intents and menus and/or services of IVR 230.

In some embodiments, nodes of IVR 230 are represented by a construct that comprises data that uniquely identify and/or indicate node. In some embodiments, the data comprises an identification of a node, denoted for example as a NodeID, and/or name of the node, denoted for example as NodeName.

The operations described above, namely, accumulating data of customers, feeding the data to the database, construction of the model, determining intents by the model, and acquiring nodes of the IVR by the correlation engine are carried out in an initial phase or training of computerized hardware 200, as opposed to the real-time or run-time phase or of computerized hardware 200 that is described below.

A call to the organization by a caller, illustrated schematically as a telephone 102, is intercepted by or directed to the computerized apparatus, denoted as an apparatus 120, which provides the caller with a predicted node of IVR 230, as described below.

The call to the organization is connected to the channel connector, denoted as a channel connector 204, via IVR 230 as illustrated by an arrow 132 and an arrow 134, respectively.

Channel connector 204 acquires the identity of the caller by a suitable method or technique such as by name and/or password provided by the caller, where the identity of the caller is referred to also as a customer ID or a caller ID. In some embodiments, the caller ID is provided via IVR 230, such as by an introductory menu or service of IVR 230.

As illustrated by an arrow 252, the caller ID is provided to the real-time manger, denoted as a real-time manager 220. As illustrated by an arrow 242, real-time manager 220 requests from database 210 the customer interaction history of the caller, or history for brevity, that comprise data of past interactions and profile of the caller as described above. Responsively, as illustrated by an arrow 244, real-time manager 220 obtains from database 210 the history and/or indication thereof of the customer, such as data of and/or reference to record or records in database 210 with respect to the history of the customer.

Based on the received history of the customer, or indication thereof, real-time manager 220 requests intent of the customer from model 110, as illustrated by an arrow 246. Responsively, as indicated by an arrow 248, model 110 provides real-time manager 220 with an intent of the customer as predicted and/or determined by model 110, the intent also referred to as a predicted intent.

Having acquired the intent from model 110, real-time manager 220 provides the intent to correlation engine 202, as illustrated by an arrow 254. Consequently, correlation engine 202 maps and/or correlates the intent with a node of IVR 230 and provides the node and/or indication thereof to channel connector 204, as indicated by an arrow 262. Responsively, channel connector 204 activates IVR 230 to vocally present the node as a menu and/or service to the caller, as illustrated by an arrow 256 and arrow 116, respectively.

In some embodiments, model 110 provides to real-time manager 220 a predicted intent of the caller. Optionally, the predicted intent is an intent determined as the most likely intent. In some embodiments, model 110 provides real-time manager 220 with intent and/or intents with likelihood above a certain threshold.

In some embodiments, in case of determined several intents, model 110 provides real-time manager 220 with the intents and correlation engine 202 associates and/or correlates the intents to one node.

FIG. 2B schematically illustrates an extension of the architecture of computerized hardware 200 with an additional component, according to exemplary embodiments of the disclosed subject matter, where for clarity some parts of the architecture of computerized hardware 200 and connections thereof are not repeatedly illustrated.

The architecture of computerized hardware 200 is extended by a component as a computerized real-time decision engine, denoted as rule engine 240, that is used for configuring and applying rules for determining an eventually prevailing node of IVR 230.

Generally, in some embodiments, rule engine 240 is comprised in real-time manager 220.

In the initial phase or training of computerized hardware 200, rule engine 240 is configured with one or more rules, where, in some embodiments, the rules are configured in rule engine 240 to override the intent and/or node based on the prediction by model 110 and where, optionally or additionally, the rules are configured in rule engine 240 to modify or refine the intent and/or node based on the data of the customers.

Generally, without limiting, the rules are based on histories of the customers and/or some particular circumstances, for example, recent repeated calls by a customer or an amount deposited by the customer in the organization.

In some embodiments, rules may be prioritized, where optionally or additionally, the prioritization is affected by the data of the customers. For example, a rule based on weekly calls of a customer to the organization has a higher priority relative to a rule based on sporadic calls to the organization by the customer.

In the real-time or run-time phase of computerized hardware 200, with reference to FIG. 2A and respective description above, once real-time manager 220 obtains a predicted intent, real-time manager 220 queries rule engine 240 whether there are rules applicable to the caller.

In case such rules are configured in rule engine 240, rule engine 240 obtains from real-time manager 220, such as responsive to a request, the history of the caller, or part thereof, as provided to real-time manager 220 from database 210. Optionally or alternatively, upon a call from the caller, real-time manager 220 provides the history of the caller to rule engine 240, optionally after verifying that there are rules applicable to the caller.

In case rules applicable to the caller are configured in rule engine 240, rule engine 240 applies the rules and responsively determines an intent, also referred to as a ruled intent, and provides real-time manager 220 with the ruled intent as schematically illustrated by an arrow 264.

Consequently, real-time manager 220 provides the ruled intent to correlation engine 202 which maps and/or correlates the ruled intent with a node such as a menu and/or service of IVR 230, and provides the node and/or indication thereof to channel connector 204, as indicated by arrow 262. Responsively, channel connector 204 activates IVR 230 to vocally present the node as a menu and/or service to the caller, as illustrated by arrow 256 and arrow 116, respectively.

It is noted that referring to rules does not preclude one rule.

An overriding rule may be exemplified in a case where a specific customer called the organization more than few times in the same day. Thus, irrespective of the expected intent, the rule decides a ruled intent to route the caller directly to special supervisor.

A refining rule may be exemplified in a case where the customer would like that in the next 2 days any call for loan intent will be routed automatically to VIP agent. Thus, receiving a predicted intent for a loan in rule engine 240, a rule checks that the predicted intent is for a loan, and modifies the predicted intent as a ruled intent for routing the customer to a VIP agent.

It is noted that in some embodiments, database 210 and/or model 110 are continually and/or periodically updated based on calls and/or contacts of the customers in the real-time or run-time phase of computerized hardware 200. Also, in some embodiments, rule engine 240 is further configured with rules in the real-time or run-time phase.

Exemplary customer's data such as stored in database 210 comprise, but not limited to, items such as:

- A unique identifier of the customer, for example, an integer number;
- Categories of last interactions, for example, as a multinomial variable for each interaction;
- Key-phrases of each interaction, for example, an array of strings for each interaction;
- A variable that indicates who initiated the interaction, for example, an Agent or a customer;
- Date/time of customer's interactions, for example, as an array of dates and times;
- The topic of each interaction, for example, as a multinomial variable;
- Channel type of each interaction, for example, as a multinomial variable;
- Customer metadata fields, for example, as a multinomial variables describing customer's gender, state, age, marital status, etc.
- Items such as menus and/or services obtained and/or accessed by the customer, for example, as a multinomial list of variables;
- Agent notes for each of the customer's interactions, for example, as an array of string.

In some embodiments, customer interaction and metadata contains the following:

- All customer interaction with their textual content and metadata. Each interaction includes and/or related to one or more topics, key-phrases, category identification that the interaction belongs to and so forth. The interaction metadata includes call duration, call time, and so forth. A customer's metadata includes, for example, age, location, gender, and so forth.

Generally, intent prediction of a customer by the model is based on a statistical classifier framework.

The framework allows to apply a variety of machine learning algorithms, such as SVM (Support vector machine), CRF (Conditional Random Fields), Neural-Network, Logistic regression and so forth as known in the art and/or variations thereof.

The classification system uses several types of features and derivation thereof:

(1) Sequential pattern mining, where data mining techniques are applied to identify sufficiently significant or prominent patterns in the sequential nature of the data of interactions sequences of specific customers over time.

Interactions sequences may be represented by topic sequences. In this case, the main topics of each interaction of the interactions sequence are extracted producing a sequence of topics. The main topics of each interaction may be extracted by applying statistical analysis such as clustering or Linear Discriminant Analysis (LDA) or matching predefined lexicon on agent notes or call transcripts.

Frequent patterns, that is, patterns that appear in more than a predefined percent of interactions sequences are extracted from the data. The feature that is used as input to the machine learning algorithm is produced by matching current interactions sequence against the extracted frequent patterns. Frequent pattern extraction can be performed by iteratively counting all the sequences and parts thereof (sub-sequences), and selecting the most frequent one.

For example, the following case is considered, as in Table-1 below, where the sequences are denoted as Sn and each call's topic is represented by a different number and where each call can have more than one topic.

TABLE 1

| Sequence ID | Sequences |
| --- | --- |
| S1 | (1), (1 2 3), (1 3), (4), (3 6) |
| S2 | (1 4), (3), (2 3), (1 5) |
| S3 | (5 6), (1 2), (4 6), (3), (2) |
| S4 | (5), (7), (1 6), (3), (2), (3) |

Thus, by the example of Table-1, the first interaction of interactions sequence S2 includes topics 1 and 4, the second interaction of interactions sequence S2 includes topic 3, the third interaction of interactions sequence S2 includes topics 2 and 3 and the forth interaction of interactions sequence S2 includes topic 1 and 5.

The most frequent patterns are identified, for example, as in Table-2 below.

TABLE 2

| Sequence ID | Sequential Pattern | Support |
| --- | --- | --- |
| S3 | (2), (3) | 75% |
| S4 | (1), (2) | 100% |
| S5 | (1), (3) | 100% |
| S7 | (4), (3) | 75% |
| S10 | (1), (3), (2) | 75% |
| S11 | (1), (3), (3) | 75% |

The support is in the sense of the SVM. Thus, by the example of Table-2, interactions sequence S4 with topics 1 and 2 occur in all the analyzed interactions sequences.

(2) Sequential rules mining, where rules that count not only the frequency of a pattern but also a confidence of a pattern extracted from the customers data.

For example, consider interaction topics a, b and c, and a condition (a, b) that implies condition (c), where condition (a, b) precedes condition (c). Thus, condition (a, b) implying condition (c) would be valid if the confidence of the implication is sufficient, where the confidence is number of sequences divided by the number of sequences where condition (a, b) occurs.

(3) Content features, where the features are based on interaction transcription and textual interactions, either directly or through additional layers of analytics. At least some significant features would be the topics of the interactions, and optionally or additionally, other items of information extracted from the texts of the interactions, such as:

- Categories to which the interaction was categorizes along with a relevance score;
- Keywords within the interactions;
- Topic of the interaction which can by extracted by applying statistical analysis such as clustering or extraction Linear Discriminant Analysis (LDA) or matching predefined lexicon on agent notes or call transcript (4) Interactions metadata features, where the features are based on metadata of the Interactions that do not require content analysis, such as Interaction length, time between Interactions or Interaction duration.

(5) CRM account features, where the features are based on account details extracted from CRM, such as account type, account owner gender or location.

The cited above are, in some embodiments, of three possible types:

Real valued numbers, such as last Interaction duration, interval between Interactions, age of the customer, the number of Interactions in the last week and/or similar values;

The cited above are, in some embodiments, of three possible types:

Real valued numbers, such as last call duration, interval between calls, age of the customer, the number of calls in the last week and/or similar values;

Binary features, such as whether a specific pattern is matched in a sequence, whether the customer age is above certain years such as sixty five, or whether a first occurrence of the last call topic is identified, and/or similar values;

(4) Interactions metadata features, where the features are based on metadata of the Interactions that do not require content analysis, such as Interaction length, time between Interactions or Interaction duration.

(5) CRM account features, where the features are based on account details extracted from CRM, such as account type, account owner gender or location.

The cited above are, in some embodiments, of three possible types:

Real valued numbers, such as last Interaction duration, interval between Interactions, age of the customer, the number of Interactions in the last week and/or similar values;

In some embodiments, all the real valued features undergo feature scaling and normalization such as by z-score normalization as known in the art Office Action variation thereof, and in some embodiments, each binary feature is given a unique identifier and a Boolean value, and in some embodiments, all the multinomial feature are converted to binary features.

In some embodiments, the features are represented in a sparse matrix manner where only non-zero valued features are present in the final feature vector.

For example given the following vector of features' values:
[0 1 0.4 0 0 0 0 0 0.9 0 0 1 . . . ]
[0 0 0 1 1 0 0 0 1 0 0 1 . . . ]

The features are represented in a sparse matrix format as exemplified below:
[ 2:1 3:0.49:0.9 12:1 . . . ]
[4:1 5:1 9:1 12:1 . . . ]

Training of the intent model is exemplified below.

Initially a set or corpus of customer interactions is provided, and for each customer the interactions sequence between the customer and the organization in a determined or predefined time frame are retrieved. Subsequently, each interaction is analyzed and features are extracted such as by the source processor. The intent of each customer is represented by a unique numeric identification (ID). In some embodiments, the intent is the topic of the last interaction of the interactions sequence.

In some embodiments, the model is constructed as a decision tree, an SVM model, a Neural-Network, or a transient model such as CRF, or any combination thereof and/or other techniques. For example, the model is constructed as an SVM model using lib-SVM such as a LIBSVM (http://www.csie.ntu.edu.tw/~cjlin/libsvm/) for training of the model.

In some embodiments, the input for the training is provided as one line or a record per customer, where each line or record starts with customer intent numeric value.

Then the list of features relevant to the customer and their related scores are also provided where each feature has a unique numerical identifier that is used to identify the features in phases of constructing and using the model. For each feature relevant to the customer the feature is inserted into the model as "featureIdentifier-featureValue" or a similar manner, where all features that are not inputted to the model are assumed to have a value of 0. In addition all feature values are normalized before they are inputted. Optionally or additionally, a non-linear kernel is used by the SVM such as by the lib-SVM module to construct the model.

Thus, in some embodiments, the result of the training phase is a model consisting of a set of vectors as a subset of the inputted data, along with vectors having or assigned with corresponding frequencies or weights.

In order to keep the model up-to-date the mode is updated with new interactions, patterns, rules and so forth, such as periodically or by demand or responsive to an event such as end of a call.

For each interaction stored as customer data in the database, an analysis is performed using, for example, the sources processor. The features are extracted from the customer data. The extracted features are applied to the pre-trained model, such as described above, producing a probability for each intent prediction.

For example the following features may be extracted for a specific customer's interactions sequence:
Last interaction duration is 123 seconds;
Interval between interactions is 5 days;
Age of the customer is 63;
Number of calls in the last week is 2;
Gender is male;
Is a specific pattern matched in this sequence?: Yes;
Is customer's age above 65?: No;
Is this the first occurrence of the last call topic?: No;
Last call categories, e.g. Billing, Account status, Purchase inquiry;
Account type, e.g. Platinum';
Marital status is Married.

All the features are converted to sparse vector format as exemplified above, and scored by a classifier decision formula. By way of example of a linear-SVM, as follows:

$$f(z) = \sum_{x_i \in S} \alpha_i y_i K(z, x_i) =$$

$$w_i \cdot z (\text{In case of linear } SVM: w_i = \alpha_i y_i x_i, \text{ and } K(z, x_i) = z \cdot x_i)$$

Where w are the corresponding weights obtained during the training procedure, and z is the input vector in sparse vector format of a specific customer. The output is a real valued number.

In case of binary classification, if f(z)>0 than the next call is predicted as from the intent represented by the model.

In case of multi-class classification, there is a score per intent, the top scored intent models are considered as the possible intent or intents of the call, where the allowed number of intents, such as three, is configurable.

In the feature vectors, optionally represented in sparse matrix format, each feature is given a unique decimal identifier and a value. Exemplary features are: 'pattern A, B, C is present in customer interaction history', 'previous call intent is A', 'the average time between two interactions is 2 days', 'customer talked about B two times in the past week', 'customer age is below 50', 'customer is male', 'customer talked about 4 different things in the last month'. Optionally the features are expresses in a sparse matrix format in a form such as 3:1, 13:5, 17:0.13, 55:1 as described above.

In view of some of the descriptions above such as with respect to FIGS. 2A-2B, some exemplary outlines of procedures of the present disclosure are provided below.

FIG. 3 briefly outlines a response to a call, according to exemplary embodiments of the disclosed subject matter.

In operation 302, responsive to a call of a customer of an organization the call is received in an IVR the organization.

Consequently, in operation 304, a response in the IVR is activated based on at least former interactions with the organization. In some embodiments, the response in the IVR is further based on a profile of the customer.

In some embodiments, former interactions with the organization comprise former interactions of the customer and/or of other customers.

Operations 302 and operation 304 are repeated, responsive to further calls of customers, as indicated by and arrow 306.

FIG. 4 outlines an operational flow 400, according to exemplary embodiments of the disclosed subject matter.

Operational flow 400 is divided to two stages or phases, as indicating by a separating dotted line 430. The first phase, indicated by an arrow 410, is a setup or training phase, whereas the second phase, indicated by an arrow 420, is a run-time phase.

In operation 402 of the training phase, the model is constructed or trained based on data and/or histories of the customers. In some embodiments, the model is trained based on interactions and other data of the customers as, for example, stored in a database.

In operation 402 of the training phase, mapping and/or associations of intents with nodes of an IVR are formed and/or determined such that one or more intents are mapped to a node and/or a node is associated with one or more intents.

In operation 406 of the training phase, optionally, rules are constructed form modifying intents or nodes as describe above and briefly below.

Operation 402, operation 404 and operation 406 may be carried out, at least partly, in parallel and/or separately in any order.

Having sufficiently setting up the training phase, the run-time phase ensues, as indicated by an arrow 434.

It is noted that the training phase, at least as the model is concerned, is also updated as interactions and/or data of customers occur and/or accumulated.

In operation 412 in case a customer calls up the organization, the call is received by the IVR of the organization.

In operation 414 the model is consulted with and an intent of the customer is obtained as predicted by the model.

In operation 422, in case rules are constructed and relate to the customer, the rule is applied thereby modifying and/or overriding the intent obtained from the model.

In operation 416 an indication, such as by ID and/or name, of an IVR node mapped and/or associated with to the indent is retrieved or resolved.

In operation 418 the indicated node as a menu and/or service is activated in the IVR responsive to the call of the customer.

The operations of the run-time phase, as indicated by arrow 420, are repeated as illustrated by an arrow 432.

Further view of some of the descriptions above such as with respect to FIGS. 2A-2B, FIG. 5 illustrates some further aspects to operational flow 400 in the run-time phase as indicated by operations 500, according to exemplary embodiments of the disclosed subject matter.

In operation 512 in case a customer calls up the organization, the call is received by the IVR of the organization.

In operation 514, based in an identification of the customer, the customer interaction history and customer profile are acquired from a database such as database 210 as illustrated by and arrow 532. In some embodiments, the database is provided with interactions data and optionally customers profile in the training phase.

In operation 516, the model, such as model 110, is queried with the customer interaction history and customer profile to obtain a predicted intent of the customer, as illustrated by an arrow 534. In some embodiments, the model is provided with the interactions data and optionally customers profile in the training phase and configured to deduce an anticipated or to predict the customers' intent in calling up the organization via the IVR. The model is configured such as by analyzing the provided data to infer or deduce an anticipated or predicted intent of the customer.

In operation 518 it is checked whether a rule is relevant to the customer. The checking is carried out, for example, by interrogating a rule engine such as rule engine 240 as illustrated by a double-arrow 530.

In case a rule is relevant to the customer, in operation 522 the rule is applied to modify and/or override the predicted intent to obtain a ruled intent. For example, a rule engine such as rule engine 240 applies and/or carries out the rule and provides the ruled intent as illustrated by an arrow 536.

In operation 524, the intent, whether as predicted by the model or as modified by the rule engine, is provided to correlation engine such as correlation engine 202 to obtain therefrom an associated IVR node, as illustrated by a double-arrow 538.

In operation 526 the indicated node as a menu and/or service is activated in the IVR responsive to the call of the customer such as by presenting to the customer a vocal message and/or a vocal prompt and/or routing to a service person.

Operations 500 are repeated as indicated by an arrow 544.

It is noted that referring to a rule does not preclude a plurality of rules.

In some embodiments, the description above with respect to FIG. 2A and/or FIG. 2B may be varied. For example, database 210 and model 110 are incorporated in one device, at least partially.

In some embodiments, rather then obtaining an intent of a customer and based on the intent determining a node of an IVR, the node is directly obtained from the model, where, optionally, the node is modified by a rule.

In some embodiments, rule engine 240 is comprised in a component of computerized hardware 200 other than real-time manager 220 such as in correlation engine 202. Further optionally or alternatively, rule engine 240 is outside of computerized hardware 200, optionally in another component such as model 110.

It is noted that although the disclosed subject matter relates to telephone calls to an IVR of an organization, yet the disclosed subject matter, possibly with variations, may be applied to other media such as Emails, SMS or other media such as Web pages and so forth. For example, responsive to a customer accessing a Web page in a Web site of the organization and having identified the customer such as by name and password, automatically responding in the Web page with a personalized web menu according to a predicted intent of the customer.

Some further exemplary scenarios of providing predicted responses to customers are provided below.

(1) Assuming the organization is an insurance company and that a customer opened an insurance claim, and that subsequently the customer called the company several times to verify the status of the claim.

Based on the behavior or repeated queries for the status, the model is updated.

When the customer calls the company again by the company IVR, the customer is presented with a menu for claim status and/or with a vocal message informing the customer with the status of the claim.

(2) Assuming the organization is a sales company who has sold numerous articles of a faulty product.

After that, the company is flooded with calls about the faulty product.

Thus, based on the numerous calls with respect to the faulty product the model is updated.

When a further calls is received in the company IVR about the product, the IVR automatically directs the calls to a technical assistance personnel and/or presents the callers with a vocal message how to handle the fault.

(3) Assuming that a customer of the organization has moved to a new residence, and that a CRM system of the organization was updated accordingly.

Thus, when the customer calls up the organization, based on the data in the CRM system the IVR of the organization automatically routes the customer to a House Insurance agent.

(4) Assuming the organization is a travel agency, the that a customer accessed a Web site of the company to book a flight but for some reason the Web site was abandoned, for example, due to communication failure.

If the customer calls the IVR of the agency within some period after the Web site failed, the IVR automatically directs the customer to flight booking menu in the IVR.

(5) Further assuming the organization in a travel agency and that a customer was trying to navigate in the IVR of the agency to find flight status but eventually failed.

Thus, when the customer calls the agency again, the calls is transferred to a booking agent who is automatically informed or notified about the flight so that the agent can promptly and efficiently aid the customer.

There is thus provided according to the present disclosure a method for responding to calls in an Interactive Voice Response system (IVR) of an organization, the method comprising receiving in an IVR a call from a customer of the organization, activating a response in the IVR based at least on former interactions with the organization, and wherein the IVR is a computerized system comprising at least one processor.

In some embodiments, the former interactions with the organization comprise former interactions of the customer with the organization.

In some embodiments, the former interactions with the organization comprise former interactions of at least one another customer with the organization.

In some embodiments, activating the response in the IVR is further based on a profile of the customer.

In some embodiments, the former interactions are used by a model constructed and configured to determine an intent of the customer which is associated with the response of the IVR.

In some embodiments, the model is configured to determine the intent of the customer based on a statistical classifier framework of machine learning.

In some embodiments, the intent is modified by an at least one rule in case the at least one rule is applicable to the customer.

In some embodiments, the at least one rule is based on at least one or both of the profile customer or the former interactions with the organization.

In some embodiments, data respective to the call from the customer is incorporated to the data of the customer thereby updating the former interactions with the organization.

In some embodiments, the model is trained by a sufficiently large corpus of interactions of customers with the organization.

In some embodiments, the response in the IVR is a vocal response.

There is thus further provided according to the present disclosure an apparatus for responding to calls in an Interactive Voice Response system (IVR) of an organization, the apparatus comprising an IVR configured to activates vocal responses to a call from a customer, a computerized model that receives past interactions of customers with the organization and configured to determine an intent of the customer based on the past interactions with the organization, and a computerized correlation engine configured to associate intents of the customer with a response of the IVR.

In some embodiments, the apparatus further comprises a database in at least one storage device and configured to accumulate the past interactions of the customers with the organization and profiles of the customers and further configured to provide the past interactions of the customers with the organization and the profiles of the customers to the computerized model.

In some embodiments, the apparatus further comprises a computerized rule engine configured to modify a determined intent by an at least one rule based on a profile of the customer when the at least one rule is applicable to the customer.

In some embodiments, the computerized rule engine is pre-configured by association responses of the IVR with intents determined by the computerized model.

In some embodiments, the computerized model is trained by a sufficiently large corpus of interactions of customers with the organization.

In the context of some embodiments of the present disclosure, by way of example and without limiting, terms such as 'operating' or 'executed' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

The term 'configuring' and/or 'adapting' for an objective, or a variation thereof, implies using at least a software and/or electronic circuit and/or auxiliary apparatus designed and/or implemented and/or operable or operative to achieve the objective.

In case electrical or electronic equipment is disclosed it is assumed that an appropriate power supply is used for the operation thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for responding to calls to an organization from customers thereof, the method comprising:
   in an initial phase;
   obtaining a sufficiently large corpus of accumulated former interactions with the organization, the corpus is obtained from a variety of sources via a plurality of different channels that comprise textual transcripts of telephonic interactions and non-telephonic textual interactions,
   training a computerized model according to behavioral patterns of the former interactions, and
   constructing profiles of customers that comprise individual personal characteristics of the customers; and
   in a run-time phase;
   receiving an indication of a call from a customer of the organization,
   predicting an intent of the customer with respect to the call based on a profile of the customer and further based on the computerized model,
   associating the intent with a node of a given Interactive Voice Response system (IVR) that comprises an at least one node, and
   activating the node, thereby providing a response to the customer;
   wherein the operations of the initial phase are updated responsive to interactions of customers with the organization, thereby forming an extended initial phase for further activities; and
   wherein the IVR is a computerized system comprising at least one processor.

2. The method according to claim 1, wherein the former interactions by the plurality of callers with the organization comprise former interactions by at least one other caller with the organization.

3. The method according to claim 1, wherein the model is configured to determine the intent of the customer based on a statistical classifier framework of machine learning.

4. The method according to claim 1, wherein the intent of the customer is modified by an at least one rule in case the at least one rule is applicable to the customer.

5. The method according to claim 4, wherein the at least one rule is based on at least one or both of the profile or the former interactions with the organization.

6. The method according to claim 1, wherein data respective to the call from the customer is incorporated to the data of the customer thereby updating the former interactions with the organization.

7. The method according to claim 1, wherein the response in the IVR is a vocal response.

8. The method according to claim 1, wherein the plurality different channels comprises any combination of direct telephone calls, telephone calls via an IVR, SMS (Short Message Service), emails, Web sites, online forums or social networks.

9. An apparatus for responding to calls in an Interactive Voice Response system (IVR) of an organization from customers thereof, the apparatus comprising:
   a computerized hardware configured for;
   obtaining a sufficiently large corpus of accumulated former interactions with the organization, the corpus is obtained from a variety of sources via a plurality of different channels that comprise textual transcripts of telephonic interactions and non-telephonic textual interactions,
   traininig a computerized model according to behavioral patterns of the former interactions, and
   constructing profiles of customers that comprise individual personal characteristics of the customers;
   a computerized system as an IVR that comprises an at least one node;
   and
   computerized components
   configured for,
   based on the profiles of the customers and the computerized model predicting intents of the customers with respect to calls of the customers to the organization, and
   associating intents of the customers with a nodes of the IVR, and
   activating nodes of the IVR and, accordingly, updating the profiles of the customers and the computerized model.

10. The apparatus according to claim 9, further comprising a database in at least one storage device and configured to accumulate the past interactions of the plurality of customers with the organization and profiles of the customers and further configured to provide the past interactions of the plurality of customers with the organization and the profiles of the customers to the computerized model.

11. The apparatus according to claim 9, further comprising a computerized rule engine configured to modify a determined intent by an at least one rule based on a profile of the customer when the at least one rule is applicable to the customer.

12. The apparatus according to claim 11, wherein the computerized rule engine is pre-configured by association responses of the IVR with intents determined by the computerized model.

13. The method according to claim 9, wherein the plurality different channels comprises any combination of direct telephone calls, telephone calls via an IVR, SMS (Short Message Service), emails, Web sites, online forums or social networks.

* * * * *